US009686031B2

(12) United States Patent
Peiffer

(10) Patent No.: US 9,686,031 B2
(45) Date of Patent: Jun. 20, 2017

(54) METHODS AND APPARATUS TO DETECT A STATE OF MEDIA PRESENTATION DEVICES

(71) Applicant: The Nielsen Company (US) LLC, Schaumburg, IL (US)

(72) Inventor: John C. Peiffer, New Port Richey, FL (US)

(73) Assignee: The Nielsen Company (US), LLC, New York, NY (US)

( * ) Notice: Subject to any disclaimer, the term of this patent is extended or adjusted under 35 U.S.C. 154(b) by 521 days.

(21) Appl. No.: 14/453,317

(22) Filed: Aug. 6, 2014

(65) Prior Publication Data

US 2016/0043818 A1 Feb. 11, 2016

(51) Int. Cl.

*H04N 7/16* (2011.01)
*H04H 60/33* (2008.01)
*H04H 60/32* (2008.01)

(52) U.S. Cl.

CPC ............ *H04H 60/33* (2013.01); *H04H 60/32* (2013.01)

(58) Field of Classification Search

None
See application file for complete search history.

(56) References Cited

U.S. PATENT DOCUMENTS 1,988,621 A 1/1935 Hansell
2,903,508 A 9/1959 Hathaway
4,574,304 A 3/1986 Watanabe et al.
4,605,958 A 8/1986 Machnik et al.
5,103,675 A 4/1992 Komninos
5,294,981 A 3/1994 Yazolino et al.
5,481,294 A 1/1996 Thomas et al.
5,839,050 A 11/1998 Baehr et al.
(Continued)

FOREIGN PATENT DOCUMENTS

EP 0946012 A2 9/1999

OTHER PUBLICATIONS

Patent Cooperation Treaty, "International Search Report," issued in connection with Application No. PCT/US2015/043465, Nov. 13, 2015, 5 pages.
(Continued)

*Primary Examiner* — Fernando Alcon
(74) *Attorney, Agent, or Firm* — Hanley, Flight & Zimmerman, LLC

(57) ABSTRACT

Methods and apparatus to detect a state of media presentation devices are disclosed. An example state detector includes a detector to identify an operational frequency of a media presentation device to be monitored by the state detector; a frequency selector to, when the operational frequency is greater than a threshold associated with a sampling rate of a component of the state detector, select a first frequency for an oscillator signal, the frequency selector to select the first frequency based on the identified operational frequency; and a status identifier to, when the operational frequency is greater than the threshold, determine a state of the media presentation device based on whether a signal representative of a combination of the oscillator signal and an input received from an audio sensor includes an element greater than a reference value, wherein at least one of the detector, the frequency selector, or the status identifier is implemented via a logic circuit.

20 Claims, 7 Drawing Sheets

(56) References Cited

U.S. PATENT DOCUMENTS

| | | | | |
|---|---|---|---|---|
| 6,272,176 | B1 | 8/2001 | Srinivasan | |
| 6,380,988 | B1 | 4/2002 | Sung | |
| 6,421,445 | B1 | 7/2002 | Jensen et al. | |
| 6,484,316 | B1 | 11/2002 | Lindberg | |
| 6,487,719 | B1 | 11/2002 | Itoh et al. | |
| 6,707,762 | B1 | 3/2004 | Goodman et al. | |
| 7,100,181 | B2 | 8/2006 | Srinivasan et al. | |
| 7,343,615 | B2 | 3/2008 | Nelson et al. | |
| 7,882,514 | B2 | 2/2011 | Nielsen et al. | |
| 8,156,517 | B2 * | 4/2012 | Nielsen | H04H 60/31 206/205 |
| 8,180,712 | B2 * | 5/2012 | Nelson | H04H 60/32 706/1 |
| 8,526,626 | B2 | 9/2013 | Nielsen et al. | |
| 8,793,717 | B2 | 7/2014 | Lee | |
| 9,027,043 | B2 * | 5/2015 | Johnson | H04H 60/32 725/14 |
| 2002/0010919 | A1 * | 1/2002 | Lu | H04H 60/37 725/18 |
| 2002/0059577 | A1 | 5/2002 | Lu et al. | |
| 2002/0198762 | A1 * | 12/2002 | Donato | H04H 60/45 725/24 |
| 2003/0046685 | A1 * | 3/2003 | Srinivasan | H04H 60/32 725/18 |
| 2005/0277401 | A1 | 12/2005 | Watabe | |
| 2006/0075428 | A1 * | 4/2006 | Farmer | H04N 5/4401 725/38 |
| 2006/0109384 | A1 * | 5/2006 | Miller-Smith | H04N 5/63 348/730 |
| 2006/0171474 | A1 * | 8/2006 | Ramaswamy | H04N 21/25891 375/240.27 |
| 2006/0209632 | A1 | 9/2006 | Goodman et al. | |
| 2007/0006275 | A1 * | 1/2007 | Wright | H04N 21/44204 725/133 |
| 2007/0192782 | A1 * | 8/2007 | Ramaswamy | H04H 60/37 725/9 |
| 2007/0266395 | A1 * | 11/2007 | Lee | H04H 60/31 725/11 |
| 2008/0148307 | A1 * | 6/2008 | Nielsen | H04H 60/32 725/9 |
| 2011/0055577 | A1 * | 3/2011 | Candelore | H04L 9/32 713/176 |
| 2011/0122258 | A1 * | 5/2011 | Masuda | H03G 3/3068 348/193 |
| 2012/0102518 | A1 | 4/2012 | Wheeler et al. | |
| 2012/0159529 | A1 | 6/2012 | Nielsen | |
| 2012/0304212 | A1 | 11/2012 | Lee | |
| 2012/0307877 | A1 | 12/2012 | Delbecq | |
| 2013/0232517 | A1 * | 9/2013 | Reis dos Santos | H04N 21/44213 725/14 |
| 2014/0007153 | A1 | 1/2014 | Nielsen et al. | |
| 2014/0302773 | A1 * | 10/2014 | Jantunen | H04W 8/005 455/3.01 |
| 2015/0052542 | A1 * | 2/2015 | Reis dos Santos | H04N 21/44204 725/14 |

OTHER PUBLICATIONS

Patent Cooperation Treaty, “Written Opinion,” issued in connection with Application No. PCT/US2015/043465, Nov. 13, 2015, 4 pages.

International Bureau, “International Preliminary Report on Patentability,” issued in connection with International Patent Application No. PCT/US2015/043465, mailed Feb. 16, 2017, 6 pages.

Patent Cooperation Treaty, “International Search Report,” issued in connection with Application No. PCT/US02/12333, Jul. 4, 2003, 2 pages.

* cited by examiner

| DEVICE IDENTIFIER | SCAN RATE (KHz) |
|---|---|
| LT84HG3 | 57.47 |
| JFJ82F0 | 48 |
| FFP23DK | 63.29 |
| HG54JF1 | 15.78 |
| ⋮ | ⋮ |
| | |

METHODS AND APPARATUS TO DETECT A STATE OF MEDIA PRESENTATION DEVICES

FIELD OF THE DISCLOSURE

This disclosure relates generally to audience measurement and, more particularly, to methods and apparatus to detect a state of media presentation devices.

BACKGROUND

Audience measurement of media (e.g., content and/or advertisements, such as broadcast television and/or radio programs and/or advertisements, steaming media, stored audio and/or video programs and/or advertisements played back from a memory such as a digital video recorder or a digital video disc, audio and/or video programs and/or advertisements played via the Internet, video games, etc.) often involves collection of media identifying data (e.g., signature(s), fingerprint(s), code(s), channel information, time of presentation information, etc.) and people data (e.g., user identifiers, demographic data associated with audience members, etc.). The media identifying data and the people data can be combined to generate, for example, media exposure data indicative of amount(s) and/or type(s) of people that were exposed to specific piece(s) of media.

DETAILED DESCRIPTION

Figure 1:
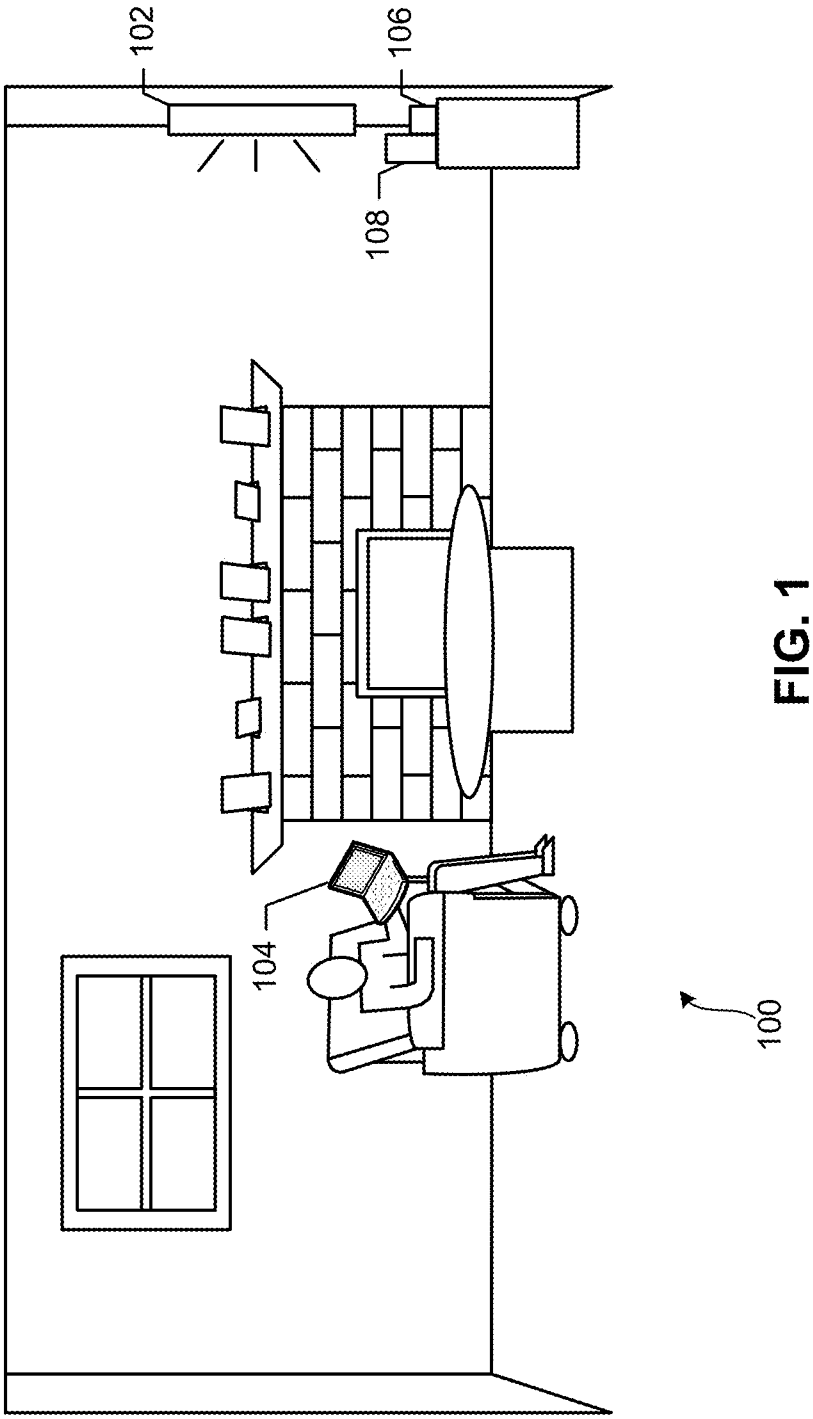
FIG. 1 is an illustration of an example media exposure environment including an example meter constructed in accordance with teachings of this disclosure.

Audience measurement systems collect data associated with media exposure environments such as, for example, a television room, a family room, a living room, a bar, a restaurant, an office space, a cafeteria, etc. For example, an audience measurement system may collect media identifying information from media presentations being played in the media environment. Additionally or alternatively, the audience measurement system may collect people data obtaining a series of images of the environment and analyzing the images to determine, for example, an identity of one or more persons present in the media exposure environment, an amount of people present in the media exposure environment during one or more times and/or periods of time, an amount of attention being paid to a media presentation by one or more persons, a gesture made by a person in the media exposure environment, etc.

In some examples, the people data is correlated with the media identifying information corresponding to detected media to provide exposure data for that media. For example, an audience measurement entity (e.g., The Nielsen Company (US), LLC) can calculate ratings for a first piece of media (e.g., a television program) by correlating data collected from a plurality of panelist sites with the demographics of the panelist. For example, in each panelist site wherein the first piece of media is detected in the monitored environment at a first time, media identifying information for the first piece of media is correlated with presence information detected in the environment at the first time. The results from multiple panelist sites are combined and/or analyzed to provide ratings representative of exposure of an audience (e.g., an entire population, a demographic segment, etc.) to the media.

In addition to and/or as part of collecting media identifying and/or people data, some monitoring systems collect state information associated with one or more media presentation devices (e.g., a television, a computer, a tablet, a smart phone, etc.). For example, monitoring systems determine whether a television in a living room is in an ON state (e.g., powered on and/or presenting image and/or audio data) or in an OFF state (e.g., powered off and/or not presenting image and/or audio data). To detect the state of a media presentation device, some monitoring systems have collected data (e.g., via a microphone) from the corresponding environment and determined whether the data includes a signal at a frequency associated with a component of the media presentation device, such as a fly-back transformer of a television. An example monitoring system that determines the state of a television in this manner is disclosed in U.S. Pat. No. 7,100,181. Methods and apparatus disclosed in U.S. Pat. No. 7,100,181 recognize that operation of the fly-back transformer (e.g., to generate the display on the screen of the television when the television is on) emits a characteristic signal (e.g., a transformer buzz) of a certain frequency to be present in the room. Methods and apparatus disclosed in U.S. Pat. No. 7,100,181 determine that the television is in an ON state when such a signal is detected in the data collected from the room (e.g., via a microphone).

To effectively detect the signal indicative of the media presentation device being in an ON state, systems use a sampling rate suitable for the frequency of the signal emitted by the operation of the television component (e.g., of the fly-back transformer). Detection of a signal of a greater frequency requires detection components operating at greater sampling rates. For example, the frequency of the signal emitted by the fly-back transformer discussed above is approximately (e.g., within a threshold) 15.78 kHz and, thus, a sampling rate of, for example, 24 kHz is sufficient (e.g., according to a reasonable expectation of accuracy) for monitoring components tasked with monitoring a television employing such a fly-back transformer. However, more advanced presentation devices (e.g., LCD displays, LED displays, and/or other flat-panel displays) do not employ a fly-back transformer that emits a frequency of approximately 15.78 kHz. Instead, such presentation devices of horizontal scanning equipment that operates at much higher scan rates. For example, some high definition televisions have horizontal scan rates of approximately 57 kHz. Some high definition computer displays (e.g., laptop screens) have horizontal scan rates of 48 kHz or 64 kHz. To effectively monitor the media exposure environment for such high definition devices, known systems would require components sampling at rates far greater than, for example, 24 kHz. High sampling rates are more computationally demanding and components capable of operating at higher sampling rates are more costly than components operating at lower sampling rates.

Example methods, apparatus, and articles of manufacture disclosed herein enable use of low cost components operating at desirably low sampling rates while detecting a state of media presentation devices (e.g., flat panel displays) employing components operating at a high frequency (e.g., relative to fly-back transformer televisions). That is, examples disclosed herein enable use of monitoring components having sampling rates associated with low frequency signals (e.g., 15 kHz) while monitoring environments for high frequency signal(s) (e.g., artifact(s)) emitted from components operating at high frequencies (e.g., 48 kHz, 57 kHz, 63 kHz, etc.). Examples disclosed herein can be utilized to detect any suitable signal(s) emitted due to operation of any suitable component of the media presentation device. Certain examples disclosed herein involve detection of a frequency corresponding to a scan rate of the media presentation device. However, examples disclosed herein can monitor the environment for one more additional or alternative frequencies associated with one or more additional or alternative components and/or functions of the media presentation device.

To enable use of low sampling rate detection components when monitoring an environment for high frequency signals, examples disclosed herein combine (e.g., mix) data collected (e.g., via an ultrasonic microphone) from an environment (e.g., a living room) including a media presentation device (e.g., a high definition flat panel television) with an oscillator operating at a frequency near (e.g., 2 kHz less than), for example, the scan rate of the media presentation device (and/or any other suitable frequency associated with any other suitable component(s) and/or function(s)). To generate a signal with which the data (e.g., audio data) is mixed, examples disclosed herein utilize a local oscillator tuned to the frequency near, for example, the scan rate of the media presentation device. The mixing operation performed by examples disclosed herein generates a signal at an intermediate frequency (IF) that is the difference between the scan rate of the media presentation device being monitored and the signal with which the collected data is mixed. The resulting intermediate frequency signal can be analyzed to determine whether the signal includes a component (e.g., an amplitude greater than a reference or threshold level) indicative of the media presentation device being in an ON state. As the intermediate frequency signal is used for the detection analysis, components (e.g., comparator circuitry, a logic circuit, a processor executing a codec, etc.) operating at a sampling rate commensurate with the intermediate frequency, rather than the high definition scan rate, can be used to analyze the collected data. Thus, examples disclosed herein enable use of more efficient, more cost-friendly, and more easily deployable monitoring equipment and techniques when detecting state information of media presentation devices.

FIG. 1 is an illustration of an example media exposure environment 100 including a first media presentation device 102, a second media presentation device 104, and an example meter 106 constructed in accordance with teachings of this disclosure. In the illustrated example of FIG. 1, the media exposure environment 100 is a room of a household (e.g., a room in a home of a panelist such as the home of a "Nielsen family") that has been statistically selected to develop television ratings data for population(s)/demographic(s) of interest. In the illustrated example of FIG. 1, one or more persons of the household have registered with an audience measurement entity (e.g., by agreeing to be a panelist) and have provided demographic information to the audience measurement entity as part of a registration process to enable associating demographics with viewing activities (e.g., media exposure). The example meter 106 of FIG. 1 can be implemented in additional and/or alternative types of environments such as, for example, a room in a non-statistically selected household, a theater, a restaurant, a tavern, a retail location, an arena, etc.

In the illustrated example of FIG. 1, the meter 106 is a dedicated audience measurement unit provided by the audience measurement entity. The example meter 106 of FIG. 1 includes its own housing, processor, memory and software to perform, for example, audience measurement and/or state detection functionality. In some examples, the meter 106 is adapted to communicate with (e.g., via a wired and/or wireless connection), for example, a server of the audience measurement entity via a network (e.g., the Internet via a router or gateway associated with the environment 100). In some examples, the meter 106 is adapted to communicate with other devices implemented in the environment 100 such as, for example, a set-top box 108, which may be capable communicating with the audience measurement entity via the network. Additionally or alternatively, the example meter 106 of FIG. 1 is adapted to communicate with a video game system capable of communicating with the audience measurement entity via the network. In some examples, the meter 106 of FIG. 1 is software installed in consumer electronics associated with the environment 100 such as, for example, the set-top box 108, a BluRay disc play, and/or a video game system (e.g., an XBOX® having a Kinect® sensor). In such instances, the example meter 106 of FIG. 1 is, for example, downloaded from a network, installed at the time of manufacture, installed via a port (e.g., a universal serial bus (USB) port receiving a jump drive provided by the audience measurement company), installed from a storage disc (e.g., an optical disc such as a BluRay disc, Digital Versatile Disc (DVD) or CD (compact Disk), and/or any other suitable manner of installation.

In the illustrated example of FIG. 1, the first media presentation device 102 is a high definition television having a scan rate of approximately 57 KHz and the second media presentation device 104 is a laptop computer including a screen having a scan rate of approximately 48 kHz. As described in detail below, the example meter 106 of FIG. 1 is able to effectively detect a state (such as the ON state or the OFF state) of the first media presentation device 102 and/or the second media presentation device 104 using a sampling rate significantly less than the respective scan rates of the first and second media presentation devices 102, 104.

Figure 2:
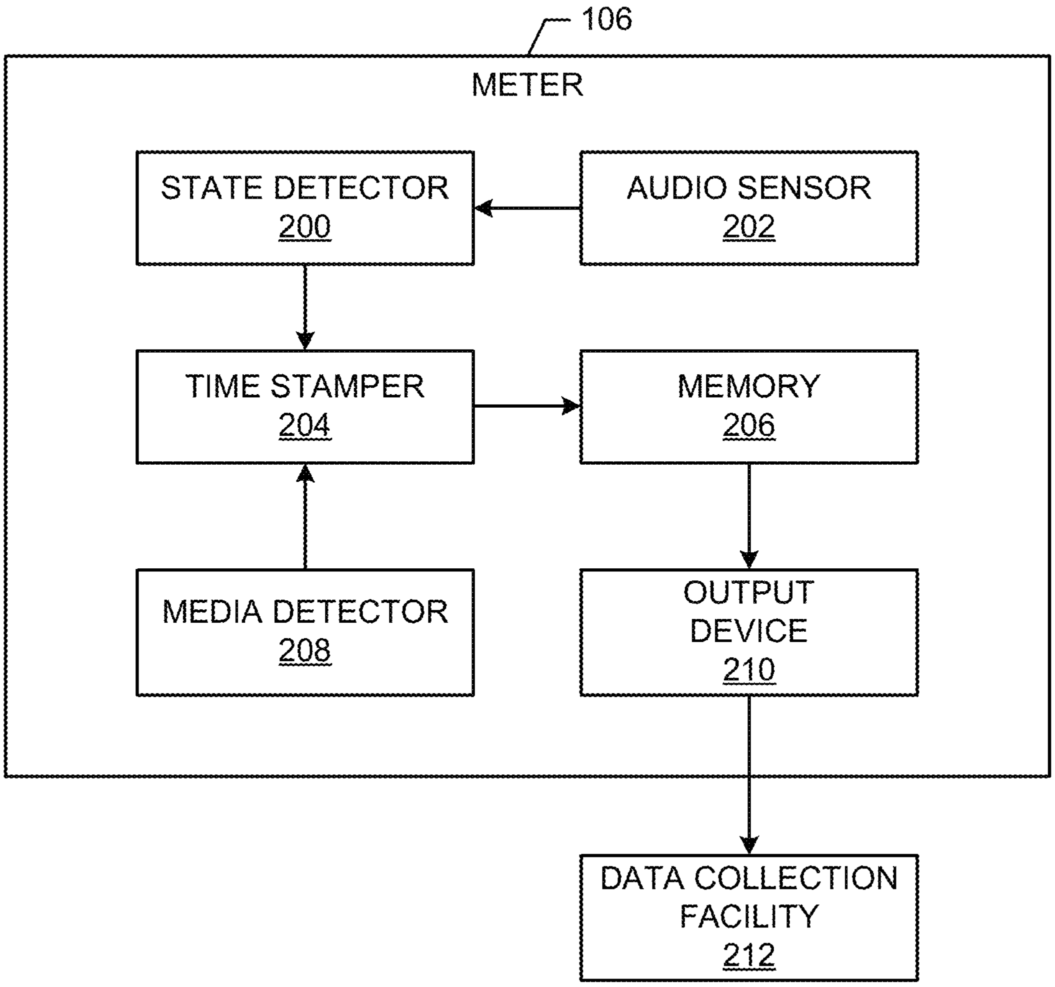
FIG. 2 is a block diagram of an example implementation of the example meter of FIG. 1.

FIG. 2 illustrates an example implementation of the meter 106 of FIG. 1. The example meter 106 of FIG. 2 includes a state detector 200 to detect a state (e.g., ON state or OFF state) of the first and/or second media presentation devices 102, 104 of FIG. 1 based on audio data collected by an example audio sensor 202. In some examples, the audio sensor 202 is implemented within a housing of the meter 106 (and/or a housing of an electronic component with which the meter 106 is integrated, such as a video game console). Additionally or alternatively, the example audio sensor 202 is a physically separate component in communication with the example meter 106. When the first media presentation device 102 is in an ON state and, thus, emitting one or more signals (e.g., artifacts) caused by the operation of one or more corresponding components, the audio data collected by the audio sensor 202 includes corresponding signal component(s) (e.g., having a magnitude above a threshold amplitude) at the corresponding one or more frequencies. For example, when the media presentation device 102 is on and, thus, scanning according to its scan rate, a frequency associated with the scan rate of the first media presentation device 102 is collected by the audio sensor 202. When the first media presentation device 102 is in an OFF state and, thus, not scanning, the audio data collected by the audio sensor 202 will not include a signal component (e.g., above the threshold amplitude) at the frequency corresponding to the scan rate of the first media presentation device 102. As described above, the scan rate of the media presentation device 102 is an example high frequency characteristic of the media presentation device 102 for which the example state detector 200 can listen. Additional or alternative characteristic(s) of the media presentation device 102 can be selected for monitoring by the example state detector 200 such as, for example, one or more components associated with a power supply of the media presentation device 102.

When the second media presentation device 104 is in an ON state and, thus, emitting a high frequency operational signal (e.g., scanning according to its scan rate), the audio data collected by the audio sensor 202 will include a corresponding signal component. When the second media presentation device 104 is in an OFF state and, thus, not operating (e.g., displaying information), the audio data collected by the audio sensor 202 will not include the signal component above the threshold amplitude at the corresponding frequency. As disclosed in detail below in connection with FIGS. 3-7, the example state detector 200 enables detection of the signals associated with the operation of the media presentation device(s) 102, 104 using sampling rate(s) significantly lower than those signals, thereby enabling use of cheaper components while maintaining accuracy.

Based on the presence or absence of the signal(s) associated with the operation (e.g., horizontal scanning) of the first and/or second media presentation devices 102, 104, the example state detector 200 of FIG. 2 outputs an indication of the state of the first and/or second media presentation devices 102, 104. In the example of FIG. 2, the state or status indication is conveyed to a time stamper 204. For example, the state detector 200 of FIG. 2 outputs a first value (e.g., true) to indicate that the monitored media presentation device is in an ON state or a second value (e.g., false) to indicate that the monitored media presentation is in an OFF state. The time stamper 204 of the illustrated example of FIG. 2 includes a clock and a calendar. The example time stamper 204 associates a time period (e.g., 1:00 a.m. Central Standard Time (CST) to 1:01 a.m. CST) and date (e.g., Jan. 1, 2014) with each state indication by, for example, appending the period of time and date information to an end of the state indication. In some examples, the time stamper 204 applies a single time and date rather than a period of time.

A data package (e.g., the state indication and the time stamp) is stored in memory 206 of the example meter 106. The example memory 206 of FIG. 2 may include a volatile memory (e.g., Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The example memory 206 of FIG. 2 may also include one or more mass storage devices such as, for example, hard drive disk(s), compact disk drive(s), digital versatile disk drive(s), etc. When the example meter 106 is integrated into, for example, a video game system or the set-top box 108, the meter 106 may utilize memory of the video game system or the set-top box to store information such as, for example, the state indications.

The example time stamper 204 of FIG. 2 also receives data from an example media detector 208 of the example meter 106. The example media detector 208 of FIG. 2 detects presentation(s) of media in the media exposure environment 100 and/or collects identification information associated with the detected presentation(s). For example, the media detector 208 of FIG. 2, which may be in wired and/or wireless communication with the first media presentation device 102, the second media presentation device 104, and/or any other component of FIG. 1, can identify a presentation time and/or a source of a presentation. The presentation time and the source identification data (e.g., channel identification data) may be utilized to identify media by, for example, cross-referencing a program guide configured, for example, as a look up table. In such instances, the source identification data is, for example, the identity of a channel (e.g., obtained by monitoring a tuner of the set-top box 108 or a digital selection made via a remote control signal) currently being presented on the media presentation device(s) 102, 104.

Additionally or alternatively, the example media detector 208 of FIG. 2 can identify media by detecting codes and/or watermarks embedded with or otherwise conveyed (e.g., broadcast) with media being presented via the set-top box 108 and/or the first and/or second media presentation devices 102, 104. As used herein, a code is an identifier that is transmitted with the media for the purpose of identifying (e.g., an audience measurement code) and/or for tuning to (e.g., a packet identifier (PID) header and/or other data used to tune or select packets in a multiplexed stream of packets) the corresponding media. Codes may be carried in the audio, in the video, in metadata, in a vertical blanking interval, in a program guide, in content data, or in any other portion of the media and/or the signal carrying the media. In the illustrated example of FIG. 2, the media detector 208 extracts the code(s) from the media. In other examples, the media detector may collect samples of the media and export the samples to a remote site for detection of the code(s).

Additionally or alternatively, the example media detector 208 of FIG. 2 can collect a signature to identify the media. As used herein, a signature is a representation of a characteristic of the signal carrying or representing one or more aspects of the media (e.g., a frequency spectrum of an audio signal). Signatures may be thought of as fingerprints of the media. Collected signature(s) can be compared against a collection of reference signatures of known media (e.g., content and/or advertisements) to identify tuned media. In some examples, the signature(s) are generated by the media detector 208. Additionally or alternatively, the example media detector 208 of FIG. 2 collects samples of the media and exports the samples to a remote site for generation of the signature(s). In the example of FIG. 2, irrespective of the manner in which the media of the presentation is identified (e.g., based on tuning data, metadata, codes, watermarks, and/or signatures), the media identification information is time stamped by the time stamper 204 and stored in the memory 206.

In the illustrated example of FIG. 2, an output device 210 periodically and/or aperiodically exports, for example, the state information and/or the media identification information from the memory 206 to a data collection facility 212 via a network (e.g., a local-area network, a wide-area network, a metropolitan-area network, the Internet, a digital subscriber line (DSL) network, a cable network, a power line network, a wireless communication network, a wireless mobile phone network, a Wi-Fi network, etc.). In some examples, the example meter 106 utilizes the communication capabilities (e.g., network connections) of another device associated with the environment 100 (e.g., a video game system and/or the set-top box 108) to convey information to, for example, the data collection facility 212. In the illustrated example of FIG. 2, the data collection facility 212 is managed and/or owned by an audience measurement entity (e.g., The Nielsen Company (US), LLC). The audience measurement entity associated with the example data collection facility 212 of FIG. 2 utilizes the state indication tallies generated by the state detector 200 in conjunction with, for example, the media identifying data collected by the media detector 208 and/or people data generated by the meter 106 to generate exposure information. The information from many panelist locations may be collected and analyzed to generate ratings representative of media exposure by one or more populations of interest.

While an example manner of implementing the meter 106 of FIG. 1 is illustrated in FIG. 2, one or more of the elements, processes and/or devices illustrated in FIG. 2 may be combined, divided, re-arranged, omitted, eliminated and/or implemented in any other way. Further, the example state detector 200, the example time stamper 204, the example media detector 208 and/or, more generally, the example meter 106 of FIG. 2 may be implemented by hardware, software, firmware and/or any combination of hardware, software and/or firmware. Thus, for example, any of the example state detector 200, the example time stamper 204, the example media detector 208 and/or, more generally, the example meter 106 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example state detector 200, the example time stamper 204, the example media detector 208 and/or, more generally, the example meter 106 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example meter 106 of FIG. 1 may include one or more elements, processes and/or devices in addition to, or instead of, those illustrated in FIG. 2, and/or may include more than one of any or all of the illustrated elements, processes and devices.

Figure 3:
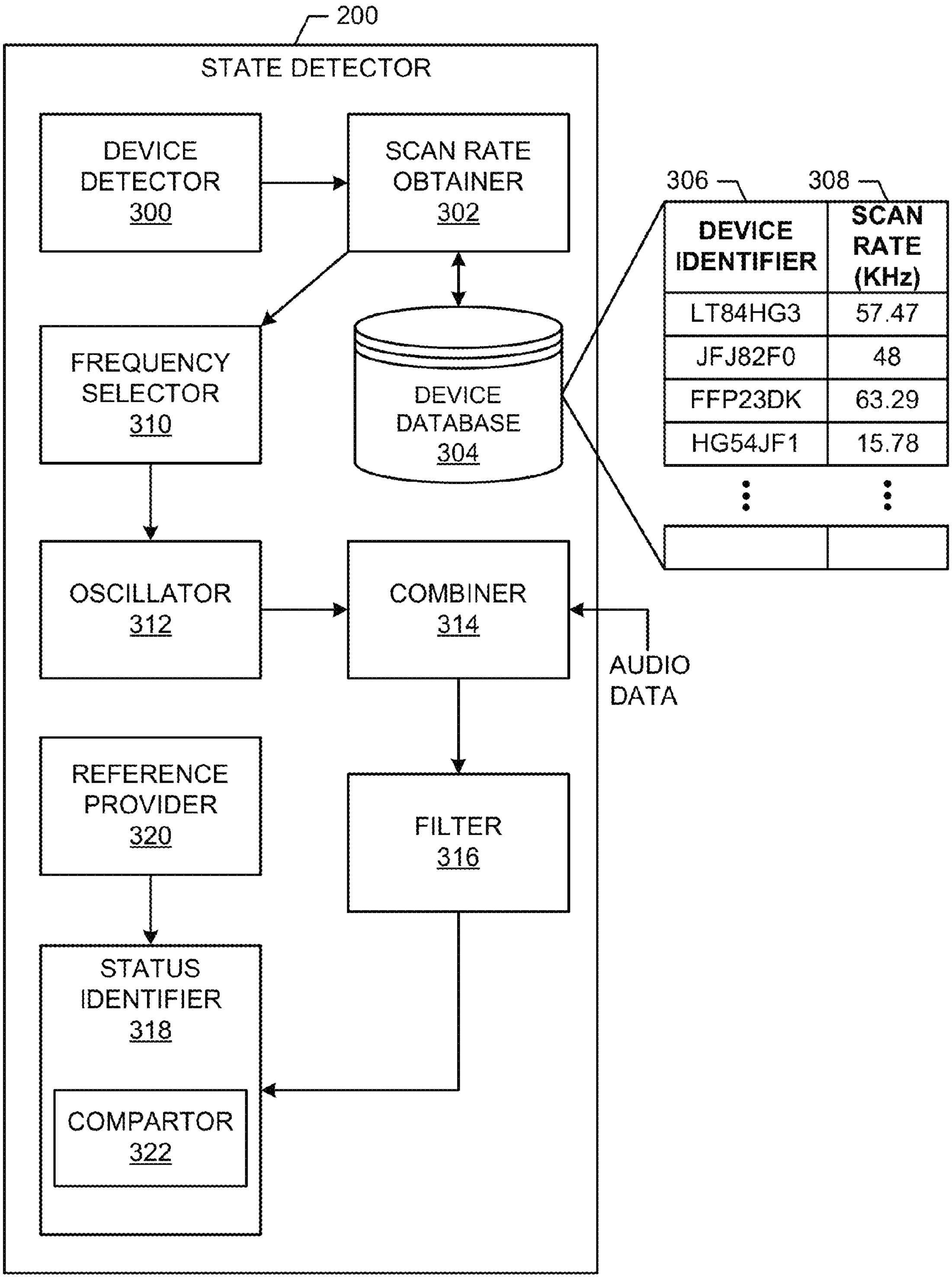
FIG. 3 is a block diagram of a first example implementation of the example state detector of FIG. 2.

FIG. 3 illustrates an example implementation of the example state detector 200 of FIG. 2. The example state detector 200 of FIG. 3 includes a device detector 300 to identify a media presentation device to be monitored by the example state detector 200. In the illustrated example of FIG. 3, the device detector 300 is provided with device identification information by, for example, a person associated with the environment 100 via a user interface and/or an administrator of the example meter 106. Additionally or alternatively, the example device detector 300 may communicate with nearby devices (e.g., via Bluetooth, WiFi, etc.) to obtain device identifying data (e.g., a brand name, a model number, a product identifier, etc.). For example, the device detector 300 of FIG. 3 may determine that the example state detector 200 is to monitor the first media presentation device 102 of FIG. 1 and that the first media presentation device 102 is a television of a particular make and model. Additionally or alternatively, the example device detector 300 of FIG. 3 may determine that the example state detector 200 is to monitor the second media presentation device 104 of FIG. 1 and that the second media presentation device 104 is a laptop computer of a particular make and model. In some examples, the state detector 200 is tasked with simultaneously monitoring the state of the first media presentation device 102, the second media presentation device 104, and/or any other media presentation device that generates a signal due to a scan rate of, for example, a display component.

In the example of FIG. 3, the device detector 300 conveys the device identifying data to a scan rate obtainer 302. The example scan rate obtainer 302 of FIG. 3 communicates with a device database 304 to obtain a scan rate of the identified media presentation device(s) to be monitored by the example state detector 200. In the illustrated example of FIG. 3, data of the device database 304 is stored on the example meter 106. However, the example device database 304 may be implemented in additional or alterative devices with which the example scan rate obtainer 302 may communicate. The example device database 304 includes a plurality of device identifiers 306 and a plurality of corresponding scan rates 308. The example device database 304 is updated to include additional device identifiers and the corresponding scan rates as new products become available. In the illustrated example of FIG. 3, a first one (LT84HG3) of the device identifiers 306 corresponds to the first media presentation device 102 of FIG. 1 which is a high definition television, a second one (JFJ82F0) of the device identifiers 306 corresponds to the second media presentation 104 of FIG. 1 which is a laptop computer, a third one (FFP23DK) of the device identifiers 306 corresponds to a third media presentation device which is a flat screen computer monitor, and a fourth one (HG54JF1) of the device identifiers 306 corresponds to a fourth media presentation device which is a standard definition television. When the example scan rate obtainer 302 queries the example device database 304 with the first one of the device identifiers 306, the device database 304 returns a first one of the scan rates 308, which is 57.47 kHz in the example of FIG. 3. When the example scan rate obtainer 302 queries the example device database 304 with the second one of the device identifiers 306, the device database 304 returns a second one of the scan rates 308, which is 48 kHz in the example of FIG. 3. When the example scan rate obtainer 302 queries the example device database 304 with the third one of the device identifiers 306, the device database 304 returns a third one of the scan rates 308, which is 63.29 kHz in the example of FIG. 3. When the example scan rate obtainer 302 queries the example device database 304 with the fourth one of the device identifiers 306, the device database 304 returns a fourth one of the scan rates 308, which is 15.78 kHz in the example of FIG. 3.

Additionally or alternatively, the example device detector 300 includes a training mode in which the example device detector 300 determines or detects the scan rate(s) of the media presentation device(s) to be monitored. In some examples, the device detector 300 is placed in a training mode and the first media presentation device 102 of FIG. 1 is placed in an ON state. During the training mode of the example device detector 300 of FIG. 3, the scan rate of, for example, the first media presentation device 102 is identified by progressing through a series of escalating frequencies and determining whether a signal of significant (e.g., greater than a threshold) amplitude at each frequency. In some examples, the series of frequencies starts at a value of 30 kHz to avoid mistaken identification of lower frequency signals as corresponding to the media presentation device 102. When a signal of significant energy is detected, the example device detector 300 of FIG. 3 stores an indicator of the detected frequency as corresponding to the scan rate of the media presentation device 102. The example device detector 300 of FIG. 3 can be placed in the training mode a plurality of times to train the example state detector 200 to monitor multiple devices. In some examples, the device detector 300 is placed in the training mode periodically to discover media presentation device(s), such as the second media presentation device 104 of FIG. 1, that have entered the environment 100 since a previous training mode. Further, the example device detector 300 of FIG. 3 may employ additional or alternative techniques for determining the one or more scan rates to be detected.

While the example device detector 300 of FIG. 3 is described above as determining a scan rate of the media presentation device(s) to be monitored, the example device detector 300 and the example state detector 200 can use any suitable characteristic frequency associated with any suitable component(s) and/or function(s) of the media presentation device(s). That is, the example state detector 200 of FIGS. 2 and/or 3 utilizes any suitable operational frequency associated with the media presentation device to be monitored. The example operational frequency used in the example of FIG. 3 is the scan rate of the media presentation device.

The example device detector 300 and/or the example scan rate obtainer 302 of FIG. 3 conveys the obtained scan rate of the media presentation device to be monitored by the state detector 200 to a frequency selector 310. The example frequency selector 310 of FIG. 3 determines whether the received scan rate corresponds to a device for which a frequency reduction is desired. In some instances, the scan rate of the media presentation device to be monitored by the state detector 200 is low enough such that the state can be effectively detected without the frequency reduction disclosed herein. For example, when the frequency selector 310 receives the fourth one of the scan rates 308 corresponding to the standard definition television, the frequency selector 310 determines that the 15.78 kHz scan rate can be detected using a desired sampling rate (e.g., 24 kHz). When the example frequency selector 310 of FIG. 3 determines that the scan rate of the device to be monitored is below a threshold (e.g., 16 kHz), the frequency selector 310 outputs an indication that no frequency reduction is to be performed for monitored the corresponding device.

When the example frequency selector 310 of FIG. 3 receives at least one scan rate above the threshold (e.g., greater than 16 kHz or another scan rate associated with a high definition media presentation device), the example frequency selector 310 determines that a frequency reduction disclosed herein is to be performed. That is, when the media presentation device to be monitored by the example state detector 200 is, for example, the first media presentation device 102 of FIG. 1 (having a scan rate of 57.47 kHz) and/or the second media presentation device 104 of FIG. 1 (having a scan rate of 48 kHz), the example frequency selector 310 of FIG. 3 initializes a procedure disclosed herein to detect such high scan rates with components operating at a comparatively low sampling rate. The example frequency selector 310 of FIG. 3 selects a frequency for a signal to be generated by an oscillator 312 of the example state detector 200. The signal generated by the example oscillator 312 is to be combined (e.g., mixed) with the audio data collected by the audio sensor 202 of FIG. 2.

The example frequency selector 310 of FIG. 3 selects a frequency near (e.g., within an amount such as, for example, 2 kHz) the received scan rate for the signal generated by the oscillator 312. Thus, the example frequency selector 310 of FIG. 3 tunes the oscillator 312 of FIG. 3 based on the scan rate of the media presentation device to be monitored by the example state detector 200. For example, when the frequency selector 310 receives the scan rate of 57.47 kHz corresponding to the first one of the device identifiers 306, the example frequency selector 310 selects 55 kHz as the frequency of the signal generated by the oscillator 312. In the illustrated example of FIG. 3, when the frequency selector 310 receives the scan rate of 48 kHz corresponding to the second one of the device identifiers 306, the example frequency selector 310 selects 46 kHz as the frequency of the signal generated by the oscillator 312. In the illustrated example of FIG. 3, when the frequency selector 310 receives the scan rate of 63.29 kHz corresponding to the third one of the device identifiers 306, the example frequency selector 310 selects 61 kHz as the frequency of the signal generated by the oscillator 312. Put another way, the example frequency selector 310 of FIG. 3 selects a frequency for the oscillator 312 that is near or similar to the scan rate of the media presentation device to be monitored by the example state detector 200.

The example oscillator 312 of FIG. 3 generates a signal at the frequency selected by the example frequency selector 310 and provides the signal to a combiner 314 of the state detector 200. In the illustrated example of FIG. 3, the combiner 314 comprises a mixer that mixes the signal provided by the oscillator 312 with the audio data provided by the example audio sensor 202 of FIG. 2. The example audio sensor 202 of FIG. 2 collects audio data from the environment 100 and conveys the same to the example combiner 314. Thus, in the illustrated example of FIG. 3, the combiner 314 generates a combination of the tuned oscillation signal and the audio data collected by the audio sensor 202.

In the illustrated example of FIG. 3, the combination generated by the example combiner 314 includes (1) a difference between the oscillation signal and the audio data and (2) a sum of the oscillation signal and the audio data. For example, when the oscillator 312 is tuned to 55 kHz and the audio data includes a 57.47 kHz signal (e.g., because the first media presentation device 102 is in an ON state and scanning at the scan rate of 57.47 kHz), the combination generated by the example combiner 314 includes a 2.47 kHz component and a 112.47 kHz component.

The example state detector 200 of FIG. 3 includes a filter 316, such as a band pass filter, to remove the 112.47 kHz component. Thus, when the first media presentation device 102 is in an ON state, the example filter 316 outputs a 2.47 kHz signal having a level (e.g., amplitude) above a reference value. As such, the frequency of the audio data on which a state determination can be made has been reduced by the example state detector 200 of FIG. 3 to a level at which a low sampling rate (e.g., a sampling rate capable of effectively measuring a 2.47 kHz signal rather a sampling rate high enough to accurately detect a 57.47 kHz signal) can be used by monitoring components.

The example state detector 200 of FIG. 3 includes a status identifier 318 that receives the output of the example filter 316. The example status identifier 318 of FIG. 3 determines whether a level (e.g., amplitude) of the received signal is greater than a reference value provided by an example reference provider 320. The example reference provider 320 outputs a value that corresponds to an expected level that is present in the audio data when the media presentation device being monitored is in an ON state. In some examples, the reference value provided by the example reference provider 320 depends on one or more conditions of the environment 100 such as, for example, an ambient sound level. In some examples, the reference provider 320 includes a lookup table having one or more reference values corresponding to, for example, one or more media presentation devices. The example status identifier 318 of FIG. 3 includes a comparator 322 to compare the level of the received signal to the reference value provided by the example reference provider 320. When the media presentation device being monitored is in an ON state, the comparison performed by the example comparator 322 results in the example status identifier 318 determining (e.g., generating an output indicating) that the level of the signal provided by the filter 318 is above the reference value. Conversely, when the media presentation device being monitored is in an OFF state, the comparison performed by the example comparator 322 results in the example status identifier 318 determining that the level of the signal provided by the filter 318 is below the reference value. In some examples, the comparison performed by the example comparator 322 may be an analog operation or a digital operation.

Notably, the example comparator 322 of FIG. 3 is able to operate at a sampling rate significantly lower than the scan rate of the media presentation being monitored. For example, the signal provided by the filter 316 having a frequency of 2.47 kHz is detectable by the status identifier 318 with the comparator 322 operating at a sampling rate of, for example, 24 kHz. As such, the example comparator 322 can operate at the same sampling rate when monitoring (1) the state of the flat panel media presentation device having a scan rate of 57.47 kHz and (2) the state of a media presentation device employing a fly-back transformer having a scan rate of 15.78 kHz. Additional or alternative components associated with the example state detector 200 are also able to operate at the lower sampling rate, thereby providing cheaper and less computationally demanding implementations of state monitoring equipment.

While an example manner of implementing the state detector 200 of FIG. 2 is illustrated in FIG. 3, one or more of the elements, processes and/or devices illustrated in FIG. 3 may be combined, divided, re-arranged, omitted, eliminated and/or implemented in any other way. Further, the example device detector 300, the example scan rate obtainer 302, the example frequency selector 310, the example oscillator 312, the example combiner 314, the example filter 316, the example status identifier 318, the example reference provider 320, the example comparator 322, and/or, more generally, the example state detector 200 of FIG. 2 may be implemented by hardware, software, firmware and/or any combination of hardware, software and/or firmware. Thus, for example, any of the example device detector 300, the example scan rate obtainer 302, the example frequency selector 310, the example oscillator 312, the example combiner 314, the example filter 316, the example status identifier 318, the example reference provider 320, the example comparator 322, and/or, more generally, the example state detector 200 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example device detector 300, the example scan rate obtainer 302, the example frequency selector 310, the example oscillator 312, the example combiner 314, the example filter 316, the example status identifier 318, the example reference provider 320, the example comparator 322, and/or, more generally, the example state detector 200 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example state detector 300 of FIG. 2 may include one or more elements, processes and/or devices in addition to, or instead of, those illustrated in FIG. 3, and/or may include more than one of any or all of the illustrated elements, processes and devices.

Figure 4:
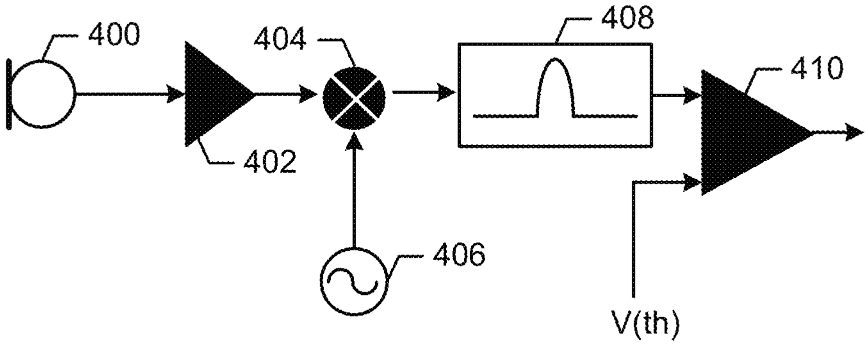
FIG. 4 is a first circuit diagram representative of an example implementation of a portion of the example state detector of FIGS. 2 and/or 3.

FIG. 4 illustrates an example circuit implementation of certain components of the example state detector 200 of FIGS. 2 and/or 3. While an example circuit is represented in FIG. 4, additional or alternative circuit implementation(s) of the example state detector 200 are possible. The example of FIG. 4 includes a microphone 400 that corresponds to the example audio sensor 202 of FIG. 2. In the illustrated example, the microphone 400 comprises ultrasonic sensitive equipment that monitors the example media presentation environment 100 of FIG. 1. In some examples, the audio sensor 202 of FIG. 2 and/or the microphone 400 of FIG. 4 is considered part of the example state detector 200. Alternatively, the example audio sensor 202 of FIG. 2 and/or the microphone 400 of FIG. 4 is considered a component of another device such as, for example, the example meter 106 and/or is considered a standalone, separate device.

In the example of FIG. 4, the microphone 400 conveys audio data (e.g., audio data including a 57.47 kHz signal due to the first media presentation device 102 of FIG. 1 being in an ON state) to an amplifier 402, which amplifies the signal according to a desired processing range. In the example of FIG. 4, the amplifier 402 conveys the amplified audio data to a mixer 404. The example mixer 404 of FIG. 4 corresponds to (e.g., may be used to implement) the example combiner 314 of FIG. 3. The example mixer 404 of FIG. 4 mixes or combines the audio data received from the amplifier 402 with a signal generated by a voltage-controlled oscillator (VCO) 406.

The example VCO 406 of FIG. 4 corresponds to (e.g., may be used to implement) the example oscillator 312 of FIG. 3. An output of the example mixer 404 of FIG. 4 includes sum and difference frequency components of the audio data and the oscillator signal. The frequency of the VCO 406 is provided by, for example, the example frequency selector 310 of FIG. 3. The sum frequency component of the audio data and the oscillator signal generated by the example mixer 404 of FIG. 4 is filtered out by a band pass filter 408. The example band pass filter 408 of FIG. 4 corresponds to (e.g., may be used to implement) the example filter 316 of FIG. 3. The difference frequency component between the audio data and the oscillator signal remains after passing through the band pass filter 408. The difference frequency component is conveyed to a comparator 410.

The example comparator 410 of FIG. 4 receives a reference, or threshold, value (Vth) representative of, for example, a level provided by the example reference provider 320 of FIG. 3. The example comparator 410 of FIG. 4 outputs a true value when the signal level is greater than the reference value, thereby indicating that the microphone 400 collected a signal having a component greater than the reference value at a frequency corresponding to the scan rate of a media presentation device to be monitored for state information. The example comparator 410 of FIG. 4 outputs a false value when the signal level is less than the reference value, thereby indicating that the microphone 400 did not collect a signal having a component greater than the reference value at the frequency corresponding to the scan rate of the media presentation device to be monitored for state information.

Figure 5:
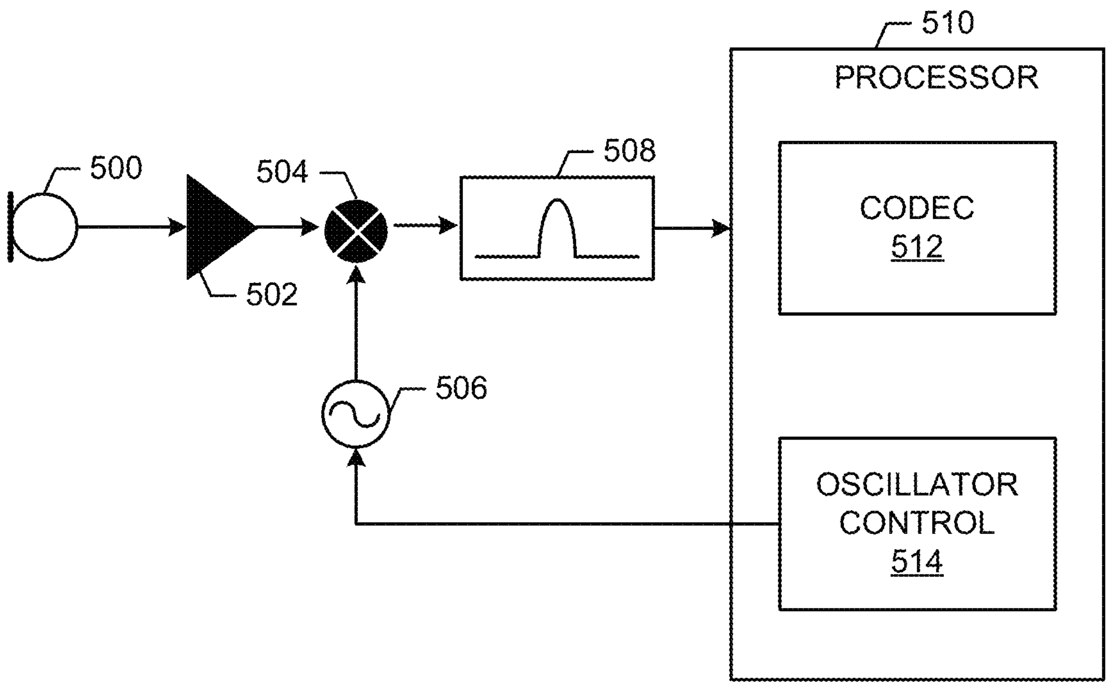
FIG. 5 is a second circuit diagram representative of an example implementation of a portion of the example state detector of FIGS. 2 and/or 3.

FIG. 5 is another circuit diagram representative of a second example implementation of the example state detector 200 of FIGS. 2 and/or 3. The example of FIG. 5 includes components similar to those of the example of FIG. 4 including a microphone 500, an amplifier 502, a mixer 504, an oscillator 506 and a band pass filter 508. The example of FIG. 5 includes a processor 510 to execute a codec 512 and an oscillator control 514. The example codec 512 comprises logic corresponding to the operation(s) performed by the example status identifier 318 of FIG. 3 and/or the example comparator 410 of FIG. 4. In particular, the example codec 512 samples the collected information (e.g., at a frequency significantly less than the scan rate of the media presentation device being monitored) and determines whether the signal includes a component (e.g., above a reference value) at the frequency indicative of the media presentation being in an ON state (e.g., via a voltage slice level detection technique).

The example oscillator control 514 of FIG. 5 comprises logic corresponding to the operation(s) performed by the example frequency selector 310 of FIG. 3. In particular, the example oscillator 514 of FIG. 5 tunes the oscillator 506 to a frequency near the scan rate of the media presentation device to be monitored. In some examples, the band pass filter 508 of FIG. 5 is implemented by the processor 510 by, for example, executing one or more Fast Fourier Transforms (FFTs).

Figure 6:
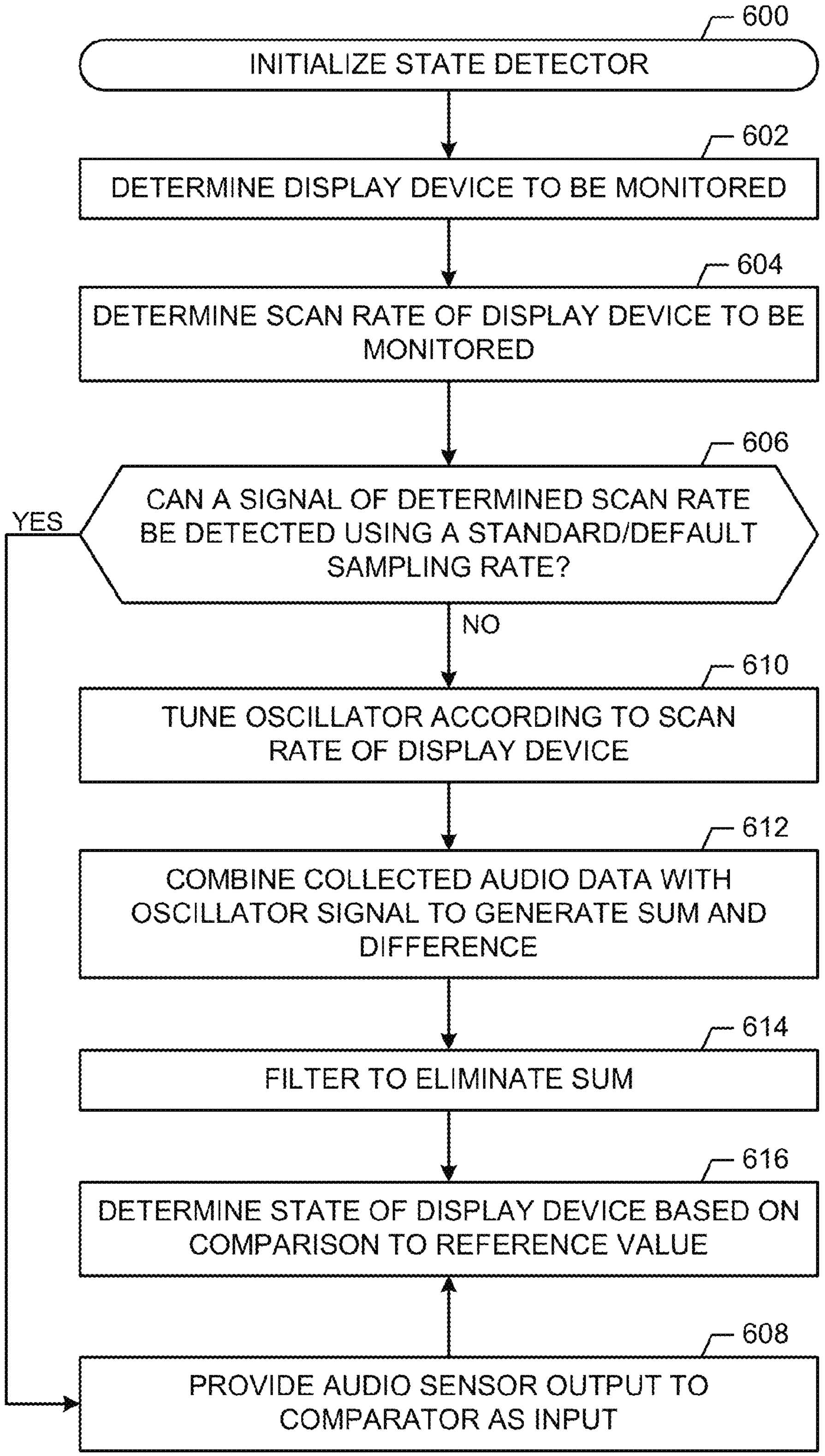
FIG. 6 is a flowchart representative of example machine readable instructions that may be executed to implement the example state detector of FIGS. 2 and/or 3.
Figure 7:
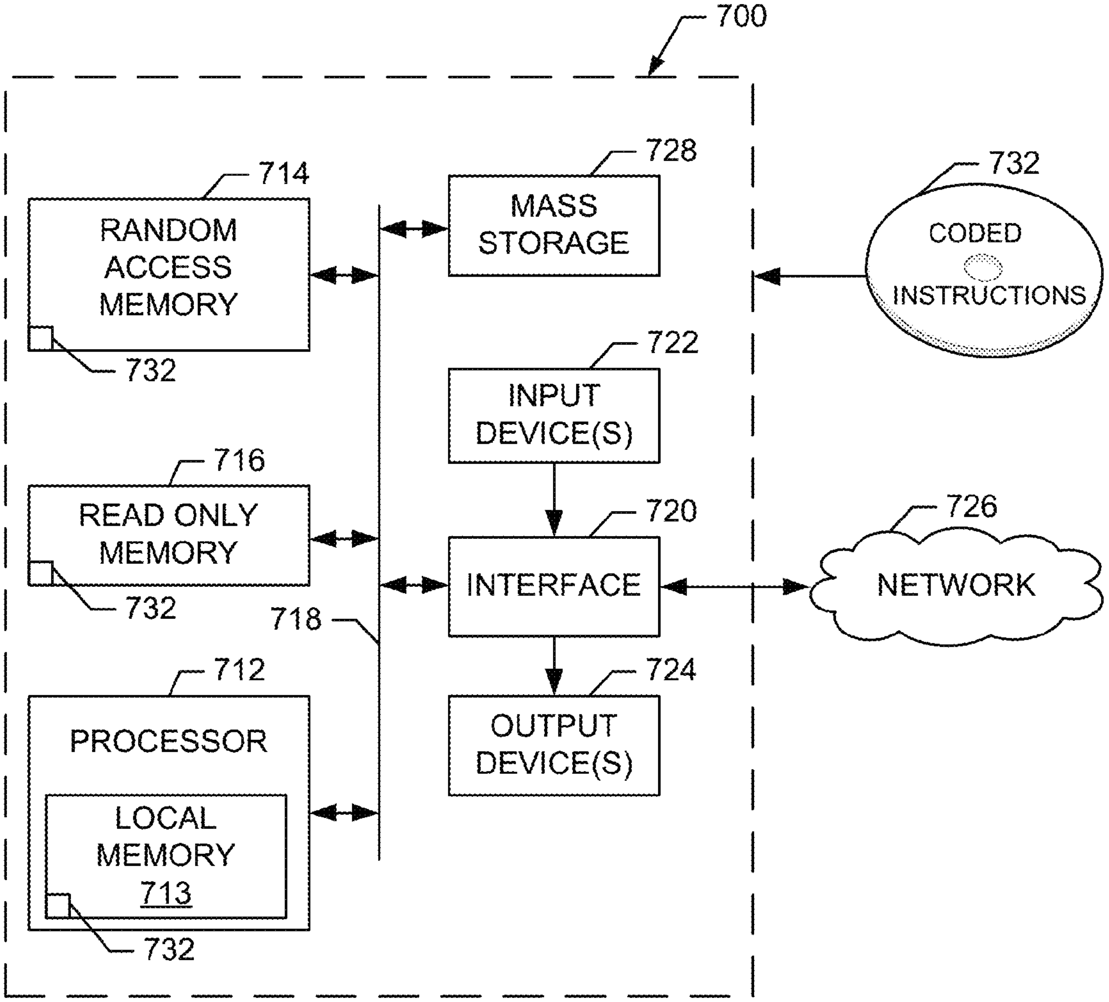
FIG. 7 is a block diagram of an example processing system capable of executing the example machine readable instructions of FIG. 6 to implement the example state detector of FIGS. 2 and/or 3.

A flowchart representative of example machine readable instructions for implementing the example state detector 200 of FIGS. 2 and/or 3 is shown in FIG. 6. In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example state detector 200 of FIGS. 2 and/or 3 may alternatively be used. For example, the order of execution of the blocks may be changed, and/or some of the blocks described may be changed, eliminated, or combined.

As mentioned above, the example processes of FIG. 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example of FIG. 6 begins at block 600 with an initialization of the example state detector 200. While the illustrated example of FIG. 6 utilizes the scan rate of the media presentation device(s) to be monitored, additional or alternative operational frequencies associated with the media presentation device(s) (e.g., frequencies emitted from an operation of additional or alternative components) can be utilized by the example state detector 200. The initialization of the state detection 200 corresponds to, for example, the example meter 106 of FIGS. 1 and/or 2 being powered on. In the example of FIG. 6, the device detector 300 determines or identifies one or more media presentation devices to be monitored by the example state detector 200 (block 602). In some examples, the device detector 300 receives an input from a user that identifies the media presentation device(s) to be monitored. In some examples, the device detector 300 communicates with any media presentation devices located in the media exposure environment 100 (e.g., by attempting to pair with present devices via, for example, Bluetooth communications). The example device detector 300 obtains identifying information indicative of an identity of the media presentation device(s) to be monitored. In some examples, the device detector 300 of FIG. 3 is placed in a training mode while the media presentation device to be monitored is in an ON state, thereby enabling the device detector 300 to identify an operational frequency of the media presentation device. While the example state detector 200 of FIG. 3 can simultaneously monitor any amount of media presentation devices, the following description of FIG. 6 includes the device detector 300 determining that the first media presentation device 102 of FIG. 1 is the device to be monitored by the example state detector 200.

In the example of FIG. 6, the scan rate obtainer 302 determines the scan rate of the first media presentation device 102 (block 604). Alternatively, when the device detector 300 was placed in the training mode, the device detector 300 is aware of the scan rate of the first media presentation device 102 and, thus, the scan rate obtainer 302 may be bypassed. Otherwise, in the illustrated example, the scan rate obtainer 302 queries the device database 304 with the device identifying information obtained by the example device detector 300. In the illustrated example, the device database returns 57.47 kHz as the scan rate of the first media presentation device 102 of FIG. 1. In the example of FIG. 6, the frequency selector 310 determines whether the scan rate of the first media presentation device 102 can be detected by a standard or default sampling rate (block 606). That is, the example frequency selector 310 determines whether the frequency reduction disclosed herein is to be performed or if the desired sampling rate (e.g., 24 kHz) can be utilized to detect the signal associated with the first media presentation device 102 being in an ON state and scanning. When the example frequency selector 310 determines that the scan rate can be detected without frequency adjustments, the audio data collected from the media exposure environment 100 is fed directly to the example status identifier 318 for detection analysis (e.g., a comparison with the reference value) (block 608). Otherwise, the example frequency selector 310 tunes the oscillator 312 to a frequency near the determined scan rate (block 610). For example, as the scan rate of the first media presentation device 102 of FIG. 1 is 57.47 kHz, the frequency selector 310 tunes the oscillator to 2 kHz.

In the example of FIG. 6, the combiner 314 combines (e.g., mixes) the audio data collected from the media exposure environment 100 and the oscillator signal (block 612). The combination performed by the combiner 314 in the example of FIG. 6 generates a sum and a difference of the received signals. In the example of FIG. 6, the sum frequency component is filtered out by the filter 316, thereby leaving the difference frequency component as an intermediate frequency (IF) signal (block 614). The resulting signal is provided to the status identifier 318. In the example of FIG. 6, the status identifier 318 determines whether the IF signal has a component greater than a reference value (e.g., threshold amplitude) (block 616). If so, the example status identifier 318 determines that the scan rate of the first media presentation device 102 is present in the media exposure environment and, thus, the first media presentation device 102 is in the ON state. If not, the example status identifier 318 determines that the scan rate of the first media presentation device 102 is not present in the media exposure environment and, thus, the first media presentation device 102 is in the OFF state.

FIG. 8 is a block diagram of an example processor platform 800 capable of executing the instructions of FIG. 6 to implement the state detector 200 of FIGS. 2 and/or 3. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIG. 5 may be stored in the mass storage device 828, in the volatile memory 814, in the non-volatile memory 816, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A state detector, comprising:

a detector to identify an operational frequency of a media presentation device to be monitored by the state detector;

a frequency selector to, when the operational frequency is greater than a threshold associated with a sampling rate of a component of the state detector, select a first frequency for an oscillator signal, the frequency selector to select the first frequency based on the identified operational frequency; and a status identifier to, when the operational frequency is greater than the threshold, determine a state of the media presentation device based on whether a signal representative of a combination of the oscillator signal and an input received from an audio sensor includes an element greater than a reference value, wherein at least one of the detector, the frequency selector, or the status identifier is implemented via a logic circuit.

2. The state detector as defined in claim 1, the sampling rate being a rate at which the component of the state detector is able to generate samples.

3. The state detector as defined in claim 1, further including a data store including:

a plurality of device identifiers;

a plurality of operational frequencies associated with the plurality of device identifiers; and a plurality of values associated with the plurality of operational frequencies, the frequency selector to choose from the plurality of values for the first frequency.

4. The state detector as defined in claim 1, further including a combiner to generate the combination of the oscillator signal and the input received from the audio sensor.

5. The state detector as defined in claim 1, the status identifier including a comparator circuit.

6. The state detector as defined in claim 1, the status identifier including a codec to be executed on a computing device.

7. The state detector as defined in claim 1, the audio sensor including an ultrasonic microphone.

8. The state detector as defined in claim 1, the component being a comparator associated with the status identifier.

9. The state detector as defined in claim 1, the state of the media presentation device including one of an on state or an off state.

10. The state detector as defined in claim 1, the status identifier to, when the operational frequency is less than the threshold, determine the state of the media presentation device based on a second comparison of a second reference value and the input received from the audio sensor.

11. A method, comprising:

determining whether an operational frequency of a media presentation device to be monitored by a state detector is greater than a threshold, wherein the threshold is based on a sampling rate of a component of the state detector; and when the operational frequency is greater than the threshold:

tuning an oscillator to a frequency based on the operational frequency, the oscillator to generate a first signal; and identifying a state of the media presentation device based on a comparison of (1) a reference value and (2) a combination of the first signal and a second signal generated by an audio sensor deployed in an environment including the media presentation device.

12. The method as defined in claim 11, wherein the combination includes an intermediate frequency signal representative of a difference between the first and second signals.

13. The method as defined in claim 11, wherein the state of the media presentation device includes an ON state or an OFF state.

14. The method as defined in claim 11, further includes obtaining the operational frequency via a training mode.

15. The method as defined in claim 11, wherein the reference value includes an amplitude.

16. A tangible computer readable storage medium comprising instructions that, when executed, cause a machine to at least:

determine whether an operational frequency of a media presentation device to be monitored by a state detector is greater than a threshold, wherein the threshold is based on a sampling rate of a component of the state detector; and when the operational frequency is greater than the threshold:

tune an oscillator to a frequency based on the operational frequency, the oscillator to generate a first signal; and identify a state of the media presentation device based on a comparison of (1) a reference value and (2) a combination of the first signal and a second signal generated by an audio sensor deployed in an environment including the media presentation device.

17. The storage medium as defined in claim 16, wherein the combination includes an intermediate frequency signal representative of a difference between the first and second signals.

18. The storage medium as defined in claim 16, wherein the state of the media presentation device includes an ON state or an OFF state.

19. The storage medium as defined in claim 16, wherein the instructions, when executed, cause the machine to obtain the operational frequency by querying a database.

20. The storage medium as defined in claim 16, wherein the reference value includes an amplitude.

* * * * *